Jan. 23, 1968  M. C. DUPLESSY  3,365,710
WATER LOSS DETECTOR
Filed Oct. 26, 1966
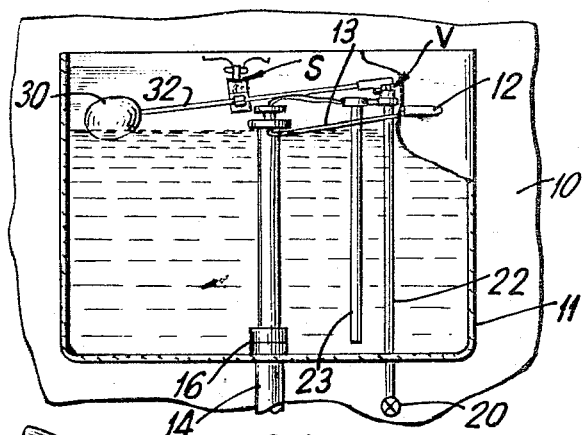
FIG. 1
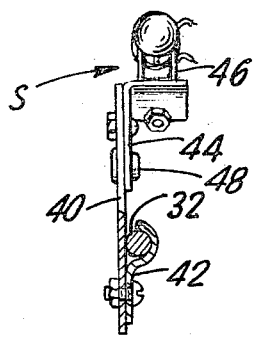
FIG. 4
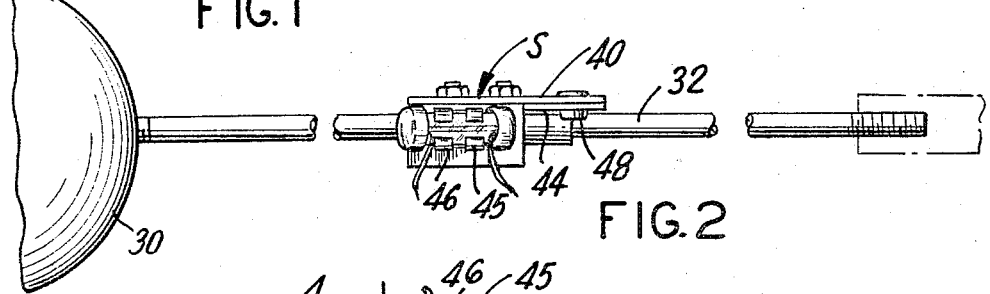
FIG. 2
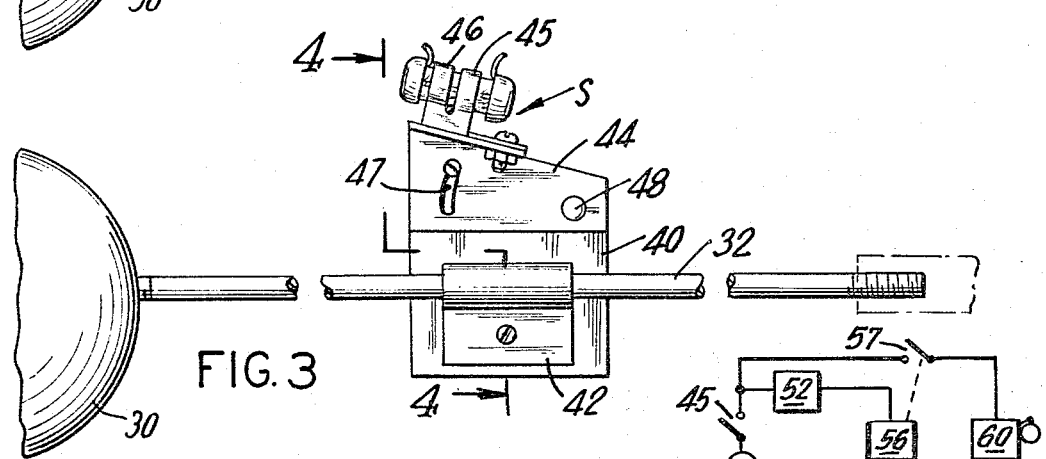
FIG. 3
FIG. 5
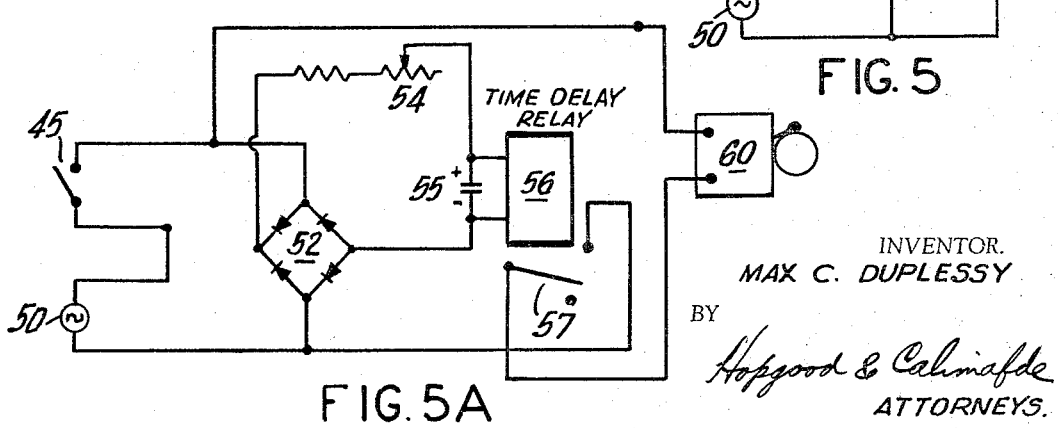
FIG. 5A
INVENTOR.
MAX C. DUPLESSY
BY
*Hopgood & Calimafde*
ATTORNEYS.

United States Patent Office 3,365,710
Patented Jan. 23, 1968

3,365,710
WATER LOSS DETECTOR
Max C. Duplessy, 14 Morne Calvaire,
Petion-Ville, Haiti
Filed Oct. 26, 1966, Ser. No. 589,555
4 Claims. (Cl. 340—242)

ABSTRACT OF THE DISCLOSURE

This invention relates to a water loss detector in which a liquid level sensing device is installed in a water closet and an alarm signal is provided if the water does not reach normal level after a certain time.

---

This invention relates to a water loss detector and particularly relates to a device for use in connection with water closets.

Water shortages present a significant problem, particularly to large cities. I have discovered that the cause of this shortage is due in a large part to an involuntary waste, although many people are inclined to think that the big problems of water shortage confronted in the large cities could be the result of wilful damage or lack of conscientiousness from home and building owners.

I believe that any solution to a problem, the cause of which remains unknown, succeeds very seldom in eradicating it.

The problem of waste may be considered quantitatively. A supply of from forty to fifty gallons of water per day per inhabitant is generally provided in any city or town. So for a city of one million people, the supply of water to be made available should be about 50,000,000 gallons per 24 hours. Let us suppose that in such a population center, there is provided one toilet for each five persons. There should be consequently 200,000 toilets. The toilets are mentioned just because they are certainly the source of the greatest proportion of the waste of water. I am considering the common type of water closets. This study is not concerned with the flushamatic type, although it also could present some defects. In fact, a low percentage of the water closets are of the flushamatic type, which requires a supply having a high pressure.

Once every twenty times at least and without any definite reason, and even if the parts inside the toilet are new, the water closet does not function properly and the valve at the bottom of the water closet tank does not close the discharge pipe after the water closet has been flushed. The valve remains hung. This condition will persist for several hours, at least until the water closet is used again. As a matter of fact, the user does not notice the fact that the valve remains hung. Accumstomed to think that, when the maneuver for flushing has been made, the rubber valve will close the pipe in time, the user leaves the place immediately, after having made the maneuver. Furthermore, unless he pays special attention to the matter, in other words, unless he checks whether or not the rubber valve is closed—such a check being dull and annoying—he will not notice it even if he stays by, because when the tank is emptied and the valve has not closed the pipe, the noise made by the escaping water is similar to and even less noticeable than that made when the tank is being refilled.

In fact, nobody pays attention to the water closet or to its working after maneuvering the flushing handle. Consequently, the water is being lost until the user, again needing to use the water closet, corrects, sometimes without knowing the fact, this improper condition of working by again maneuvering the flushing handle, or, when a private reservoir is concerned, until such a reservoir is completely emptied. In countries where water is supplied to a group of persons through a large public reservoir, the waste of water coming from this source may be unlimited.

Let us consider the case of a person who has used the toilet prior to going to his occupation. It is generally the last place visited before leaving the house. This person must go to his place of work, where he will remain for about 8 hours or more, and then, return home after having attended to private matters. He used the water closet and flushed it before going out. The valve did not close the pipe and this fact, of course, escaped his attention. Eight seconds is the time necessary for an ordinary water closet tank to be emptied, and after these eight seconds, the loss of water starts, the tank is not refilled, and the water flows directly into the septic tank. In case of cesspools, other nuisances created by this condition might occur such as various unsanitary conditions, including water pollution.

Within one minute, 3½ gallons of water are lost, or 210 gallons within one hour, or 2,100 gallons during the ten hours the user remains out of his house. We suppose, which is not always the case, that the person, as soon as he came home, used the water closet again and that this improper condition of working of the water closet was, at that time, fortuitously corrected. The same loss may occur during the night, and for an equivalent period of time, since the toilet is the last place seen prior to retiring. It should be said that the loss during the night is even more important. Because at night, the water pressuer is at its maximum, due to the fact that the ordinary consumption of water is very low, the loss per minute can amount to 5 gallons, bringing the loss per hour to 300 gallons.

Let us try an approximation, by supposing that in this city, where we have 200,000 toilets, ten percent of them are alternatively causing a waste of water for an average of 20 out of 24 hours. This percentage is low in comparison with what exists in fact. Let us also suppose what is not, that the loss per hour during night time is the same during day time.

During the 20 hours, we have a waste of 210×20, or 4,200 gallons per toilet, and for the ten percent, or 20,000 toilets, the waste of water attains the huge sum of 84,000,000 gallons per 24 hours. It appears then that although 50,000,000 gallons per day would have been enough for that city, if the consumption of water were normal, due to to the drastic waste originated from the improper working of some toilets, the water supply has to be brought to an amount of 134,000,000 gallons.

In fact, we can say without any exaggeration that at least half, if not ⅔, of the water drawn from public reservoirs is wasted in this manner. This problem is consequently of public interest.

Briefly in explaining my invention, let us consider the water closet tank filled with water. In these conditions, the hollow ball floats over the water. The rod which connects it to the valve of the filling pipe is carried by this position of flotation, and reaches an almost horizontal position. In this position, the rod acts by the interposition of a small lever movable about its axle, over the valve of the filling pipe to keep it closed, so that water is no more supplied to the tank. When the maneuver for flushing is performed, the discharge pipe valve, which is located at the bottom of the tank, is forced to rise and to occupy a position above the discharge pipe, which is then opened, allowing the water in the tank to evacuate the waste matter in the toilet bowl. The hollow ball follows the level of the water and carries the rod which from its horizontal position descends towards the bottom of the tank, making then with the horizontal an angle of more than 30 degrees, when the tank is completely emptied. In this position, the rod does not convey any pressure to the valve of the filling pipe. The said valve is then opened and the water flows into the tank. If the working is normal, as soon as the tank is emptied, the valve controlling the opening and the closing of the discharge pipe descends and closes the discharge pipe, so that the water coming from the filling pipe now refills the tank. The water level rises gradually. The hollow ball follows this movement and the rod reascends in order to reach its horizontal position, which determines the closing of the filling pipe valve.

When, due to any defect whatever, the valve of the discharge pipe remains hung, the water coming from the filling pipe flows away through the discharge pipe. The water in the tank is at its lowest level. The hollow ball is at its lowest position and is not even in contact with the water. The rod being carried by its weight and this of the hollow ball continues to make with the horizontal an angle of about 30 degrees. This position will continue as long as the water level remains the same.

Assume that any improper working of the discharge pipe valve creating an important loss of water, prevents the water closet tank from being refilled. In consequence, the water in the tank is at its lowest level. The hollow ball no longer acts on the rod, except by its weight. The rod assumes an angle of greater than 30 degrees with the horizontal. It can then be said that the state of working of a water closet is determined, when the angular position of the rod with respect to the horizontal is known. In other words, the angular position of the hollow ball rod depends upon the proper functioning of the water closet.

In my invention, I utilize a circuit, being able to unlatch an alarm and having a time basis, which closes or opens according to the angular position of the hollow ball rod with respect to the horizontal.

One object of this invention is to provide a system for detecting water waste. A further object of this invention is to provide a system for detecting malfunctioning in a water closet. A third object is to provide a simple and reliable apparatus which may be used to determine continuous water flow and wastage in a water closet. Still another object of this invention is to provide a simple and readily adjustable device which will provide an indication when the water in a water closet has not reached desired levels.

Other objects of this invention will be better understood from the more detailed description hereinafter following when read in connection with the accompanying drawing in which:

FIG. 1 is a sectional view of a conventional water closet illustrating my invention.

FIG. 2 is an enlarged top view showing my invention mounted on the ball rod.

FIG. 3 is a side view showing the position of my invention on the ball rod.

FIG. 4 is an enlarged sectional view along the lines 4—4 of FIG. 3.

FIG. 5 is a schematic diagram illustrating my control system.

FIG. 5A is a detailed circuit diagram.

Referring now to FIG. 1, there is shown a conventional water closet 10 having a tank 11 and a flushing handle 12. When the handle 12 is rotated, a lever 13 picks up a valve 16 to allow water to be discharged through pipe 14. This essentially comprises the flushing operation. Thereafter, water from inlet pipe 20 flows through pipe 22, and then down through pipe 23 to refill the tank. Intermediate between pipes 22 and 23 is a valve V controlled by a rod 32, the other end of which has a hollow ball secured thereto. When the ball is in the position shown in FIG. 1, valve V is closed, but when the ball is lower because of the water level being at a lower than desired level, valve V is open.

If, for example, the water closet was malfunctioning, the water level would necessarily be at a lower than desired level. In order to determine this condition, I provide a level-sensing device S which is mounted on rod 32.

Referring now to FIGS. 1, 3, and 4, this sensing device comprises a bracket having plates 40, 42, and 44 which are secured to the rod 32. A clip portion 45 is part of the plate 44, which clip holds a mercury liquid switch. The bottommost plate 40 can be generally flat and the securing plate 42 can be flat and having a clamping section such that the rod 32 can be held between these plates when they are screwed together. A plate 44 has an arcuate slot 47 and a pivotal point 48 which may, for example, be a screw. The position of the screw for slot 47 determines the angle of the clip holder 45 with respect to the horizontal and necessarily the mercury switch 46 which is secured thereto.

If, as shown in FIG. 1, the rest position of rod 32 is at a down angle, the position of plate 44 may be adjusted so that the mercury switch 46 is at a horizontal position. On the other hand, if the rod 32 is at a greater than desired angle, the mercury switch itself will be placed at an angle and will effectively be closed.

FIG. 5 illustrates a simple alarm diagram and while this invention will be explained in conjunction with a buzzer 60, it will be understood that other indicating devices may be utilized at one or more locations, for example, if a large apartment house is to contain these devices, additional indicating means may be provided at a central location to insure that the apartment owner is cognizant of a defective water closet and also to insure that proper remedial steps are taken.

In FIG. 5 there is shown a conventional A.C. source 50 of 110 volts. In a first circuit with source 50 is mercury switch 45, a rectifying bridge circuit 52, and a time delay relay 56. The time delay relay or other time delay control means is intended to provide operation of the alarm after the normal cycle of a working water closet. Relay 56 will close an associated contact 57 when it is actuated. Contact 57 is in series circuit with the alarm 60 and the A.C. source 50.

If the mercury switch closes, A.C. signals will be rectified at 52, and will gradually build up a charge on the capacitor of the time delay relay 56. When this charge reaches a predetermined level, contact 57 closes and the alarm 60 is actuated.

FIG. 5A shows essentially the same circuit except that a full wave bridge rectifier 52 applies its output over a variable potentiometer 54. The capacitor 55 of the time delay relay is also shown. The actual time delay may be varied by the setting of the potentiometer 54.

Here again when the mercury switch is closed, pulsating D.C. signals are applied to capacitor 55 which build up at a time determined by the potentiometer 54. Relay 56 picks up, closes contact 57 to place both terminals of alarm 60 across the power source 50.

When, in fact, the maneuver for flushing is performed, the valve at the bottom of the tank is forced to ascend and the water in the tank flows into the discharge pipe. The rod passes gradually from its horizontal position to its position of rest, which indicates an angle of about 30 degrees with respect to the horizontal, within 8 seconds. When the valve at the bottom of the tank closes the discharge pipe and the tank is being refilled, the angular position of the hollow ball rod with respect to the horizontal is about 20 degrees, within 10 seconds. Of course, there are some small variations of these data for each toilet. If, every time, the water in the tank reached its lowest level, so to say, at every flushing, the alarm resounded, and stopped only when the tank is half full, that would rather constitute a nuisance for the user. The device must only warn the user when the working of the water closet is improper. The switch closes itself, for example, when the angular position of the hollow ball rod will exceed 25 degrees and will open itself, when this angular position with respect to the horizontal will be less than 25 degrees. As a result of the fact that, during a certain time, the rod occupies an angular position with respect to the horizontal, varying from 25 to 30 degrees and from 30 to 25 degrees, it will be allowed enough time, for example, 20 seconds, before the alarm is unlatched. So the switch closes itself, as soon as the position of the hollow ball rod with respect to the horizontal is 25 degrees. The rod continues to descend to attain its maximum angular position with respect to the horizontal. Then, if the working of the water closet is normal, the valve at the bottom closes the discharge pipe. The tank is being refilled. The hollow ball ascends and the rod leads gradually from its position of rest to its horizontal position. Within 10 seconds, its angular position with respect to the horizontal is about 24 degrees. At this moment, the switch opens itself. If, then, the arrangement of the switch is as specified and the circuit set to unlatch the alarm, let us say after 20 seconds, the alarm will not resound, if the working of the water closet is normal, that is to say, if there is no important loss of water or if there is no defect in the water supply system. Nevertheless, if the water closet is not working properly, in other words, if, after flushing the valve at the bottom of the tank remains hung and does not close the discharge pipe, allowing in this manner the water to be wasted, or if the filling of the tank is not made, due to a defect in the water supply system, the alarm will unlatch, after the time which has been set, and the user will be informed of this improper condition of working, so he can correct it.

Here, the mercury switch with tilt action makes contact when its angular position towards the bottom with respect to the horizontal is three degrees.

If the mercury switch clip holder was directly fastened to the hollow ball rod, the circuit would be closed as soon as the angular position of the rod with respect to the horizontal would be three degrees, because the mercury switch makes contact when its angular position with respect to the horizontal is three degrees. However, the circuit is closed at least when the angular position of the rod with respect to the horizontal is about 25 degrees, and due to the imperfections of some models of water closet, I am able to vary the angle of closing or opening of the switch, according to the genuine angular position of the rod at rest with respect to the horizontal.

What is claimed is:

1. A system for detecting malfunctioning in a water closet having an inlet fluid source, a valve controlling the flow of fluid through said source, a rod having a hollow ball, said rod controlling position of said valve, the invention comprising liquid level-sensing means coupled to said rod to sense a change in the angle of said rod, alarm means responsive also to said liquid level sensing means, switch means to control said alarm means, timing means controlling said switch means to provide an alarm signal only after the rod is at a lower than normal level after the time of a normal flush cycle expires.

2. An invention of claim 1, said switch means including a bracket having means for supporting a mercury switch, said bracket having means for variably fixing the indicator position of said mercury switch.

3. An inventor of claim 2 in which said bracket comprises a bottom plate and a rod-securing plate and further including a switch supporting clip means.

4. The invention of claim 1 in which said timing means includes a line delay relay controlling said switch means.

References Cited

UNITED STATES PATENTS

| | | | |
|---|---|---|---|
| 1,633,386 | 6/1927 | Rutledge | 200—61.47 |
| 2,412,452 | 12/1946 | Green | 200—84 X |
| 2,756,410 | 7/1956 | Tobias | 340—244 X |
| 2,794,880 | 6/1957 | Carothers | 200—84.2 |
| 3,173,152 | 3/1965 | McCrink | 4—52 |

THOMAS B. HABECKER, *Acting Primary Examiner.*

NEIL C. READ, *Examiner.*

D. MYER, *Assistant Examiner.*